United States Patent [19]

Nees et al.

[11] 4,137,378

[45] Jan. 30, 1979

[54] CALCIUM-STRONTIUM-LEAD GRID ALLOY FOR USE IN LEAD-ACID BATTERIES

[75] Inventors: John Nees, Wyomissing; Dale A. Bailey, Hamburg, both of Pa.

[73] Assignee: General Battery Corporation, Reading, Pa.

[21] Appl. No.: 802,182

[22] Filed: May 31, 1977

[51] Int. Cl.² .............................................. H01M 4/66
[52] U.S. Cl. .................................................. 429/245
[58] Field of Search ........................ 429/245, 225–228; 75/166 R, 166 D, 167

[56] References Cited

U.S. PATENT DOCUMENTS

| | | | |
|---|---|---|---|
| 2,013,487 | 9/1935 | Canfield et al. | 75/166 R |
| 2,040,078 | 5/1936 | Canfield et al. | 75/166 |
| 2,170,650 | 8/1939 | Bouton et al. | 429/226 |
| 3,881,953 | 5/1975 | Turowski | 429/245 |

*Primary Examiner*—Charles F. LeFevour
*Attorney, Agent, or Firm*—Benasutti Associates, Ltd.

[57] ABSTRACT

A novel calcium-strontium-tin-lead grid alloy is disclosed which exhibits a finer grain structure, higher hardness, improved castability and superior corrosion resistance.

2 Claims, No Drawings

CALCIUM-STRONTIUM-LEAD GRID ALLOY FOR USE IN LEAD-ACID BATTERIES

BACKGROUND OF THE INVENTION

For many years lead-acid batteries, and particularly lead-acid automotive batteries have incorporated battery grids cast of lead-antimony grid alloys. These lead-antimony alloys exhibit suitable hardness and resistance to corrosion, however have the undesirable side effect of encouraging "local action", sulphation and gassing that is, electrolysis of the sulfuric acid solution during overcharging.

More recently with the development of what has been termed "maintenance free" batteries — batteries which are not intended to have water added to them, or to which water is to be in-frequently added — practitioners in the art have begun to look for other materials which exhibit suitable strength, castability, hardness, and corrossion resistance, while eliminating the gassing and other problems heretofore exhibited by high antimony grid alloys.

For many years it has been known to utilize either strontium or calcium, with or without tin, in lead alloys used to form the grids of storage batteries.

In U.S. Pat No. 2,040,078 entitled, "Lead Alloy", dated May 12, 1936 strontium is disclosed as imparting a desirable degree of hardness to lead, while overcoming certain disadvantages previously associated with lead-antimony alloys. For instance, 0.08% strontium added to pure lead is disclosed as providing an alloy which, after quenching from 300° C. and aging for 3 weeks at 100° C., has a Brinell hardness from 7 to 9, which is a desirable hardness for storage battery grids. Alternatively, U.S. Pat. No. 2,040,078 discloses the use of strontium in combination with tellurium.

Also of interest to the present application is U.S. Pat. No. 2,013,487 entitled, "Lead Alloy", dated Sept. 3, 1935 wherein it is disclosed that good results were obtained with alloys containing from 0.2% to 1.5% of one of the elements chosen from the group of barium, strontium, and calcium; tin from 0.2% to 2.0%; and with the remainder being lead. In particular, U.S. Pat. No. 2,013,487 additionally discloses that any two or all three of the metals barium, calcium and strontium may be used in the same alloy "providing the total percentage thereof lies between 0.2% and 1.5%, the quantity of tin being as above mentioned". (all percentages being taken by weight).

SUMMARY OF THE INVENTION

The present invention provides a novel calcium-strontium-tin grid alloy for use in lead-acid batteries wherein the total weight percentage of calcium and strontium is far less than that heretofore through necessary to produce suitable storage battery grids. This fact results from the discovery that calcium and strontium, particularly when used in combination with tin, exhibit an unexpected synergism when combined in such an alloy. In particular, it has been found that a given weight of approximately equal amounts of calcium and strontium produces a far superior lead alloy to that produced when equivalent weights of either calcium or strontium are combined with lead. Accordingly, it has been found that a desirable battery grid alloy may be produced wherein very little calcium and/or strontium need be added in order to produce a suitable lead grid-alloy. For example, a suitable grid may comprise a total calcium-strontium weight percent of only about 0.08 wt-% yet exhibit characteristics similar to those exhibited only by grids having several times this amount of either strontium or calcium. While the particular interaction between these elements is not fully understood, it is known that the relatively large grain structures of either calcium-tin-lead or strontium-tin-lead alloys are not exhibited by the calcium-strontium-tin-lead alloy of the present invention. Rather the grain structure becomes proportionally refined as the proportions of calcium to strontium approach "50-50", such refined grain structure being accompanied by increasing hardness. In addition to the economy of using less calcium or strontium to harden the grid alloy, the presence of less of these materials in the alloy and the novel interaction between these materials at these levels minimizes the local action, gassing, corrosion and/or sulphation of the grids formed thereof.

Accordingly, the preferred embodiment alloy of the present invention consists essentially of 0.01 to 0.09 wt-% calcium, 0.01 to 0.10 wt-% strontium, and 0.1 to 1.0 wt-% tin, with the remainder of the alloy being lead and standard trace impurities. As mentioned above, in the preferred embodiment, the amounts of calcium and strontium used in the preferred grid alloy should be approximately equal to achieve maximum hardness. It is preferred to keep the amounts of calcium and strontium at levels of about 0.03 to 0.04 wt-% calcium and about 0.04 to 0.05 wt-% strontium, with tin in the preferred range of from about 0.3 to 0.5 wt-%.

In alternate embodiments, trace amounts of aluminum in weight percentages less than 0.03 wt-% and preferably less than about 0.02 wt-% may be utilized to inhibit oxidation, and alternatively may also incorporate, in combination with aluminum, trace amounts of lithuim, cadmium, or less preferably, magnesium, provided the total of these trace elements does not exceed the aforementioned percentages.

Accordingly, the primary object of the present invention is the provision of a superior lead-alloy for use in casting the grids of lead-acid storage batteries. A further object of the present invention is the provision of a fine grain structure, high hardness, easily castable grid alloy exhibiting superior corrosion resistance and minimal "local action" or "gassing" when incorprorated as part of a lead-acid battery. These and other objects of the present invention will become apparent from the following examples:

Although specific forms of the invention have been selected for illustration and the following description is drawn in specific terms for the purpose of describing these forms of the invention, this description is not intended to limit the scope of the invention which is defined in the appended claims.

EXAMPLE I

One preferred grid alloy made in accordance with the present invention which has been found to be particularly suitable for use in forming the grids of lead-acid storage batteries consist essentially of: 0.04 wt-% strontium; 0.3 wt-% tin; trace impurities not exceeding about 0.02 wt-%, as for example, aluminum, cadmium, and lithium; with the remainder being lead.

EXAMPLE II

Where economic considerations control, or where properties other than strength of the battery grids are to be maximized, a suitable grid alloy may consist essentially of the following: 0.04 wt-% calcium, 0.08 wt-% strontium, 0.5% tin, and trace impurities not exceeding about 0.02 wt-%, with the remainder being lead.

EXAMPLE III

If desired, trace amounts of particular elements may be utilized in order to impart other characteristics to such grid alloys, as for example the addition of aluminum to the alloy as an oxidation inhibitor, etc., provided those trace elements do not exceed 0.03 wt-% and are preferably held to about 0.02 wt-% or less. Accordingly, in this embodiment a suitable alloy may consist essentially of 0.01 to 0.09 wt-% calcium, preferably 0.04 wt-%; 0.01 to 0.10 wt-% strontium, preferably 0.04 wt-%; 0.01 to 1.0 wt-% tin, preferably 0.3 to 0.5 wt-%; and trace elements not to exceed 0.03 wt-%, preferably 0.02 wt-% of, for example, aluminun, with the remainder being lead.

It will be understood that various changes in the details and materials which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. In a lead-acid storage battery having a plurality of grids disposed therein; the improvement wherein said grids comprise a lead alloy consisting essentially of about 0.04 wt-% calcium; about 0.04 wt-% strontium; 0.1 to 1.0 wt-% tin; trace impurities not exceeding 0.03 wt-%, with the remainder of said alloy being lead.

2. The invention of claim 1 wherein said tin is present in the amount of between 0.3 to 0.5 wt-%.